United States Patent [19]

Pedeutour et al.

[11] Patent Number: 5,518,793
[45] Date of Patent: May 21, 1996

[54] PIPEWORK ELEMENT COATING AND METHOD OF APPLYING

[75] Inventors: Jean-Marc Pedeutour, Blenod les Pont-A-Mousson; Jean Bello, Gezoncourt; Gerard Nouail, Metz; Rio Bellocci, Pont-A-Mousson, all of France

[73] Assignee: Pont-A-Mousson S.A., Nancy, France

[21] Appl. No.: 281,163

[22] Filed: Jul. 27, 1994

[30] Foreign Application Priority Data

Jul. 28, 1993 [FR] France ..................... 93 09303

[51] Int. Cl.$^6$ ..................... F16L 58/00
[52] U.S. Cl. ............. 428/36.91; 428/632; 138/109; 138/143; 138/145
[58] Field of Search ............. 428/36.91, 632; 138/109, 143, 145

[56] References Cited

U.S. PATENT DOCUMENTS 3,584,655  6/1971  Frank et al. ............. 138/109
3,990,478  11/1976  McFarland ............. 138/103
4,853,297  8/1989  Takahashi et al. ............. 428/623
4,885,215  12/1989  Yoshioka et al. ............. 428/632

FOREIGN PATENT DOCUMENTS 0178404  4/1986  European Pat. Off. .
2347604  11/1977  France .

Primary Examiner—Charles R. Nold
Attorney, Agent, or Firm—Sughrue, Mion, Zinn, Macpeak & Seas

[57] ABSTRACT

A cast-iron pipework element adapted to be buried has an external coating made up of an inner layer of zinc, a porous intermediate layer of zinc/aluminium alloy containing from 5 to 55% of aluminium, and a porous outer layer, or pore-blocking layer, comprising an organic binder, especially a water-based paint, a bitumen varnish or an epoxy resin.

9 Claims, No Drawings

20

PIPEWORK ELEMENT COATING AND METHOD OF APPLYING

BACKGROUND OF THE INVENTION

This invention relates to the corrosion protection of pipelines consisting of iron-based, especially cast-iron, pipework elements. By "pipework elements" is meant the pipes as well as their various accessories, such as elbows, couplings, etc. The invention applies principally to buried pipelines, but may also be used in the case of overground pipelines.

The soil corrosion of ferrous metals is a phenomenon whose nature is different from atmospheric corrosion, and essentially consists of the creation of oxidation zones electrically associated with reduction zones which may be located some distance away. Localized and consequently significant deterioration of the ferrous metal therefore occurs.

The anti-corrosion protection of buried pipework elements is thus particularly difficult, the more so as terrains are heterogeneous and of very diverse types, as the pipework elements, depending on their use, convey fluids at different temperatures, modifying the corrosion conditions, and as the handling of the pipework elements intended to be buried frequently leads to damage at various places on their external surfaces.

SUMMARY OF THE INVENTION

An object of this invention is thus to provide a technique for coating an iron-based pipework element, especially a buried one, which for an acceptable cost ensures good corrosion protection whatever the purpose of the pipeline, especially for water supply and for sewage, and in the great majority of terrains.

For this purpose, the subject of the invention is an iron-based, especially cast-iron, pipework element, especially for a buried pipeline, provided with an external coating made up of a first, inner layer of zinc, a second, porous intermediate layer of zinc/aluminium alloy containing from 5 to 55% of aluminium, and a third, porous outer layer, or pore-blocking layer, comprising an organic binder, especially a water-based paint, a bitumen varnish or an epoxy resin.

The pipework element may have one or more of the following characteristics:

1) the first layer is porous;

2) the first layer is provided in a quantity of at least 130 $g/m^2$, preferably at least 200 $g/m^2$;

3) the layer of alloy is provided in a quantity of at least 130 $g/m^2$ preferably at least 150 $g/m^2$;

4) the pore-blocking layer has a thickness of between 80 and 150 μm.

The invention also provides a method of protecting an iron-based, especially cast-iron, pipework element from corrosion, especially soil corrosion, comprising the following steps:

a) the deposition, especially by arc metallization, of a first layer of zinc;

b) the deposition by arc metallization of a second layer of zinc/aluminium alloy containing from 5 to 55% of aluminium; and c) the deposition of a third, porous layer, called a pore-blocking layer, comprising an organic binder, especially a water-based paint, a bitumen varnish or an epoxy resin.

DETAILED DESCRIPTION OF THE PREFERRED EMBODIMENT

An example of the implementation of the invention, applied to a water-supply or sewage pipework element made of ductile cast iron will now be given. In this example, the coating defined above is applied in three stages to the cast iron taken after passing through a heat-treatment furnace, and therefore possessing a skin consisting of iron oxides.

In a first stage, a first layer of zinc is deposited by electric-arc metallization.

Next, a second layer, consisting of a zinc/aluminium alloy, is deposited by electric-arc metallization on the first layer.

Finally, the finishing layer, called the pore-blocking layer, comprising an organic binder, especially a water-based paint, a bitumen varnish or an epoxy resin, is deposited by spraying. This spraying may, in particular, be performed by means of a paint gun operating without air or with compressed air.

This coating essentially acts in the following manner. The layer of zinc is said to be "sacrificial" with respect to the cast iron. The reason for this is that it may be progressively consumed by oxidation under the effect of the electrochemical cell formed by the cast iron, the zinc and the soil, in order to protect the cast iron underneath or bared at defects or areas of damage in the coating, by the formation of a layer protecting it from the corrosion products which form stable precipitates in the medium where they are created.

The corrosion products block off and scar over the damaged areas, but if the zinc becomes depleted, this layer is progressively destroyed over time without being replenished, and the cast iron is no longer protected.

An essential factor leading to the depletion of this zinc is the autocorrosion of zinc which consumes this metal. The second layer, of zinc/aluminium alloy, protects the layer of zinc from this phenomenon, itself being the site for the autocorrosion. The interaction between the first layer of zinc and the second layer of alloy stabilizes each metallic layer in order to form a long-term protective layer.

Due to its deposition by arc metallization, the layer of alloy consists of solidified droplets and it is therefore porous. These pores are partially blocked off by the appearance of the precipitates produced by the corrosion of the zinc, the progression of the soil electrolyte towards the layer of pure zinc being thus retarded in the layer of alloy. Furthermore, the porosity of this layer of alloy promotes good bonding of the pore-blocking layer.

It should be noted in this regard that the migration of the corrosion products from the first layer of zinc into the second layer of alloy enables the second layer to be blocked off, thus reducing the diffusion of the active species from the soil towards the cast iron. Consequently, the protective layer formed by the controlled transformation of the various layers of the coating offers better long-term integrity than the transformation layers produced from one or the other of the zinc/alloy metallic constituents of the coating according to the invention.

The porous character of the layer of zinc is similarly advantageous, since it increases the active surface area of the zinc, and therefore the effectiveness of the galvanic protection, and, in addition, it promotes the good bonding of the layer of alloy.

The layer of zinc and the layer of zinc/aluminium alloy therefore have essentially complementary functions, and it is found that their superimposition in respective quantities of preferably at least 200 g/m² and 150 g/m² protects the cast iron effectively from soil corrosion.

The pore-blocking layer principally makes it possible to slow down the autocorrosion of the zinc and, consequently, to promote the build up of a compact and dense layer of zinc-corrosion products, so as to maintain their protective effect. The thickness of the pore-block has to be sufficient to ensure effective retardation of the autocorrosion of the zinc, but sufficiently small to enable the galvanic protection and the build up of the corrosion products to function correctly. In addition, too great a thickness of the pore-block would lead to the trapping of water beneath it and to the formation of blisters. It has thus been determined that the thickness of the pore-block should be between 80 and 150 µm.

We claim:

1. A cast-iron pipework element, provided with an external coating comprising:

a) a first, inner layer of zinc, b) a second, porous intermediate layer of zinc/aluminium alloy containing from 5 to 55% of aluminium, and c) a third, porous outer layer comprising an organic binder selected from the group consisting of a water-based paint, a bitumen varnish, and an epoxy resin.

2. A pipework element according to claim 1, wherein the first layer is porous.

3. A pipework element according to claim 1, wherein the layer of zinc is provided in a quantity of at least 130 g/m².

4. A pipework element according to claim 1, wherein the layer of alloy is provided in a quantity of at least 130 g/m².

5. A pipework element according to claim 1, wherein the outer layer has a thickness of between 80 and 150 µm.

6. A method of protecting a cast-iron pipework element from corrosion, comprising the following steps:

a) depositing by arc metallization, a first layer of zinc, b) depositing by arc metallization a second layer of zinc/aluminium alloy containing from 5 to 55% of aluminium, and c) depositing a third, porous layer comprising an organic binder selected from the group consisting of a water-based paint, a bitumen varnish and an epoxy resin.

7. A method according to claim 6, Wherein the layer of zinc is deposited in a quantity of at least 130 g/m².

8. A method according to claim 6, wherein the layer of alloy is deposited in a quantity of at least 130 g/m².

9. A method according to claim 6, wherein the third layer is deposited by spraying, preferably to a thickness of between 80 and 150 µm.

* * * * *